US010393244B2

(12) United States Patent
Horiike et al.

(10) Patent No.: US 10,393,244 B2
(45) Date of Patent: Aug. 27, 2019

(54) ROLLING DEVICE

(71) Applicant: THK CO., LTD., Tokyo (JP)

(72) Inventors: Kazuya Horiike, Tokyo (JP); Soshi Miyahara, Tokyo (JP); Masakazu Takahashi, Tokyo (JP)

(73) Assignee: THK CO., LTD., Tokyo (JP)

( * ) Notice: Subject to any disclaimer, the term of this patent is extended or adjusted under 35 U.S.C. 154(b) by 311 days.

(21) Appl. No.: 15/302,783

(22) PCT Filed: Mar. 3, 2015

(86) PCT No.: PCT/JP2015/001125
§ 371 (c)(1),
(2) Date: Oct. 7, 2016

(87) PCT Pub. No.: WO2015/155928
PCT Pub. Date: Oct. 15, 2015

(65) Prior Publication Data
US 2017/0030447 A1 Feb. 2, 2017

(30) Foreign Application Priority Data

Apr. 10, 2014 (JP) ................. 2014-080774
Nov. 20, 2014 (JP) ................. 2014-235489

(51) Int. Cl.
*F16C 33/66* (2006.01)
*F16C 29/06* (2006.01)
(Continued)

(52) U.S. Cl.
CPC ....... *F16H 25/2214* (2013.01); *F16C 29/046* (2013.01); *F16C 29/0604* (2013.01);
(Continued)

(58) Field of Classification Search
CPC ............. F16H 25/2214; F16H 57/0497; F16C 29/046; F16C 29/0604; F16C 29/0609;
(Continued)

(56) References Cited

U.S. PATENT DOCUMENTS 4,582,369 A * 4/1986 Itoh .................... F16O 29/0607
384/13
6,170,986 B1 1/2001 Hsu et al.
(Continued)

FOREIGN PATENT DOCUMENTS

CN 1269474 A 10/2000
EP 2 604 875 A1 6/2013
(Continued)

OTHER PUBLICATIONS

International Search Report dated Jun. 9, 2015, issued in counterpart International Application No. PCT/JP2015/001125 (2 pages).
(Continued)

Primary Examiner — William Kelleher
Assistant Examiner — Gregory Robert Weber
(74) Attorney, Agent, or Firm — Westerman, Hattori, Daniels & Adrian, LLP

(57) ABSTRACT

This rolling device 10 includes an inner member 11 provided with a rolling element rolling groove 11a, and an outer member 21 attached to the inner member 11 to be relatively movable via a plurality of rolling elements 12. The outer member 21 includes an outer member main body portion 22 including a loaded rolling element rolling groove 25 forming a loaded rolling element rolling raceway in cooperation with the rolling element rolling groove 11a and a non-loaded rolling element rolling raceway 33 arranged to correspond to the loaded rolling element rolling groove 25, and a pair of lids 24 attached to both end surfaces of the outer member main body portion 22 in a relatively-moving direction and
(Continued)

having at least a part of a direction changing raceway 35 connecting one end of the loaded rolling element rolling raceway to one end of the non-loaded rolling element rolling raceway 33. Each of the lids 24 is provided with a projection portion 24b including at least the part of the direction changing raceway 35. Also, the projection portion 24b is provided with a lubricant supply path 38. With this configuration, this rolling device 10 can circulate the plurality of rolling elements smoothly in an endless circulation raceway.

5 Claims, 14 Drawing Sheets

(51) Int. Cl.
*F16H 25/22* (2006.01)
*F16H 57/04* (2010.01)
*F16C 29/04* (2006.01)

(52) U.S. Cl.
CPC ........ *F16C 29/065* (2013.01); *F16C 29/0609* (2013.01); *F16C 29/0611* (2013.01); *F16C 29/0642* (2013.01); *F16C 29/0647* (2013.01); *F16C 33/6659* (2013.01); *F16C 33/6681* (2013.01); *F16H 57/0497* (2013.01)

(58) Field of Classification Search
CPC .............. F16C 29/0611; F16C 29/0642; F16C 29/0647; F16C 29/065; F16C 33/6659; F16C 33/6681
USPC ........................................... 74/89.33; 384/13
See application file for complete search history.

(56) References Cited

U.S. PATENT DOCUMENTS

| | | | | |
|---|---|---|---|---|
| 6,203,199 B1 * | 3/2001 | Pfeuffer | ............ | F16O 29/0607 384/13 |
| 7,604,408 B2 * | 10/2009 | Dorn | .................. | F16O 29/0609 384/45 |
| 7,798,716 B2 * | 9/2010 | Haub | .................. | F16O 29/0609 384/13 |
| 8,167,492 B2 * | 5/2012 | Natale | ................ | F16O 29/0609 384/13 |
| 9,004,762 B1 * | 4/2015 | Lee | ....................... | F16C 33/664 384/13 |
| 9,939,013 B2 * | 4/2018 | Matsumoto | ......... | F16C 29/0609 |
| 2009/0304312 A1 * | 12/2009 | Horie | .................. | B25J 19/0062 384/13 |
| 2010/0111454 A1 | 5/2010 | Natale et al. | | |
| 2011/0176754 A1 | 7/2011 | Yoshida | | |

FOREIGN PATENT DOCUMENTS

| | | |
|---|---|---|
| JP | 2007-85423 A | 4/2007 |
| JP | 2007-92902 A | 4/2007 |
| JP | 2007-271003 A | 10/2007 |
| JP | 2007-333147 A | 12/2007 |
| JP | 2009-68658 A | 4/2009 |
| JP | 2010-521638 A | 6/2010 |
| JP | 2011-149469 A | 8/2011 |
| JP | 2013-108621 A | 6/2013 |
| JP | 2014-40922 A | 3/2014 |
| WO | 2007/074754 A1 | 7/2007 |

OTHER PUBLICATIONS

Office Action dated Feb. 1, 2018, issued in counterpart Chinese Application No. 201580018786.2, with partial English translation. (11 pages).
Office Action dated Nov. 14, 2017, issued in counterpart Japanese Application No. 2014-235489. (3 pages).

\* cited by examiner

[Fig. 1]
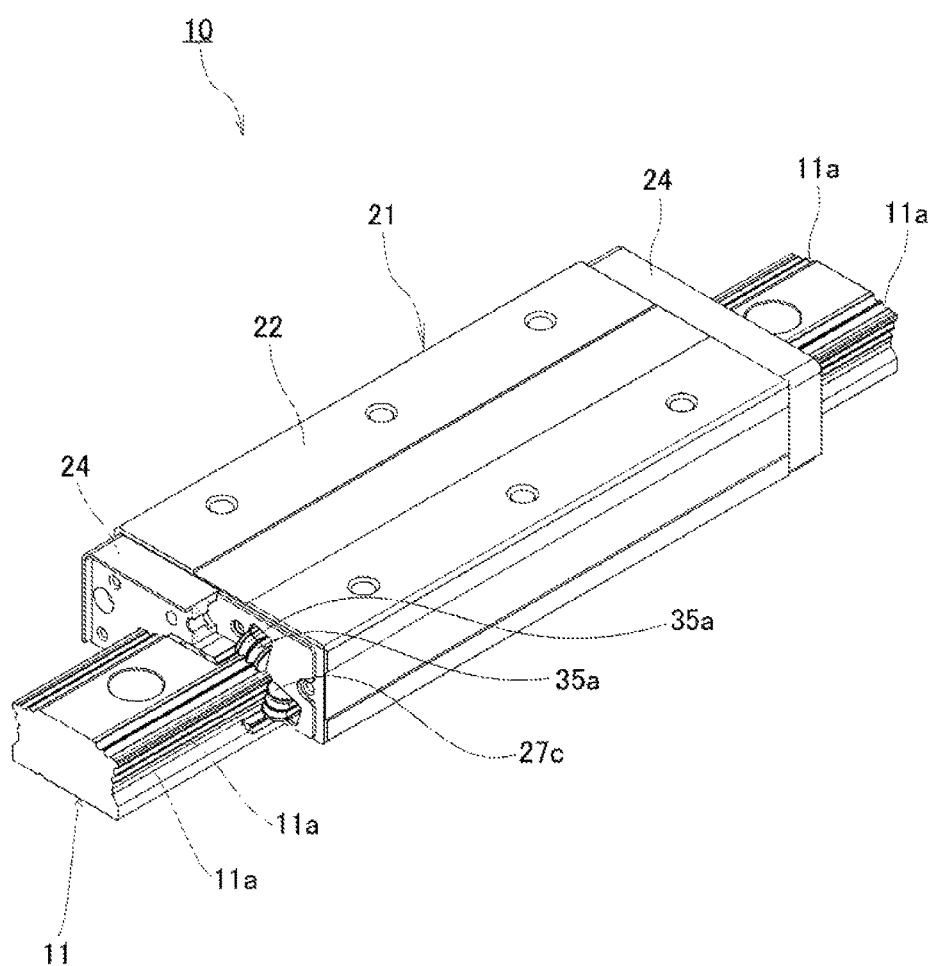

[Fig. 2]
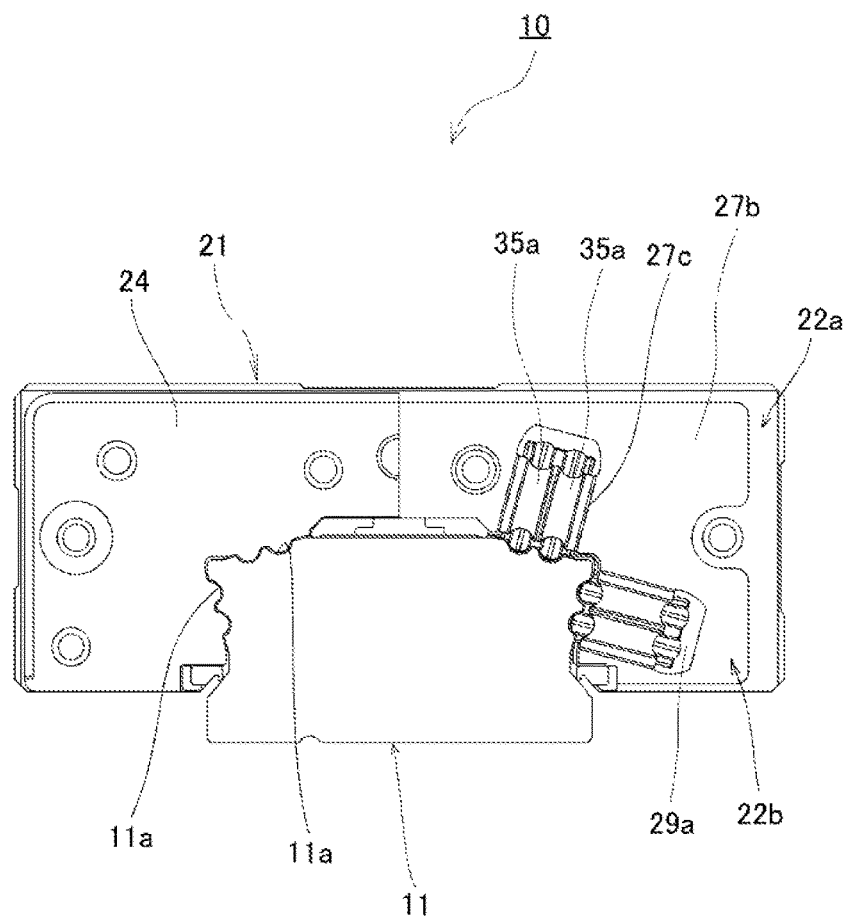

[Fig. 3]
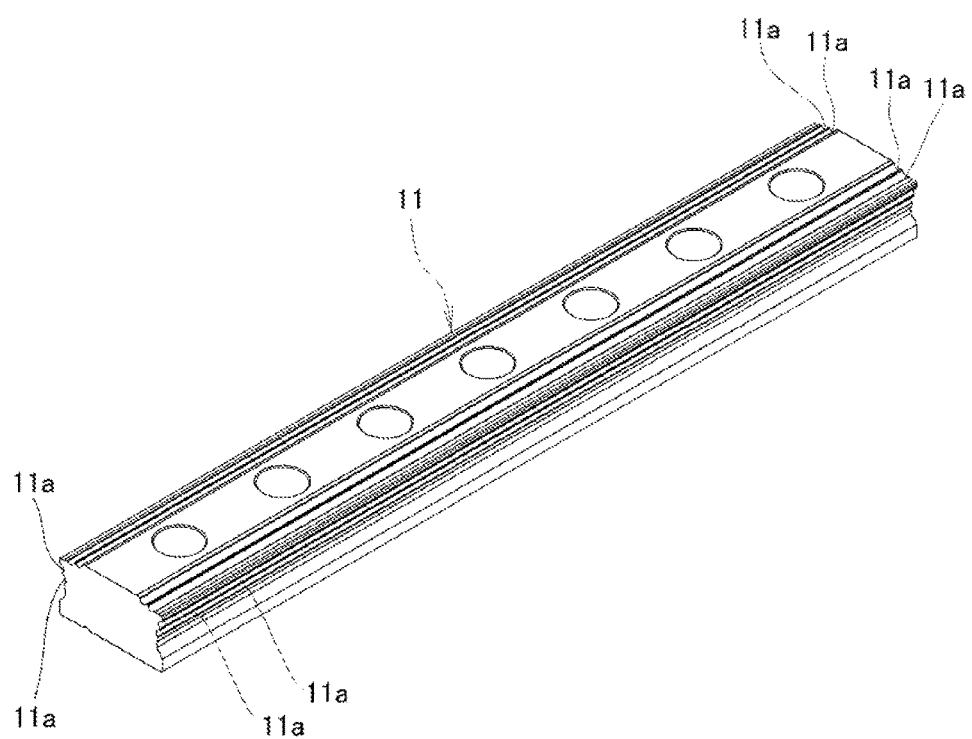

[Fig. 4]
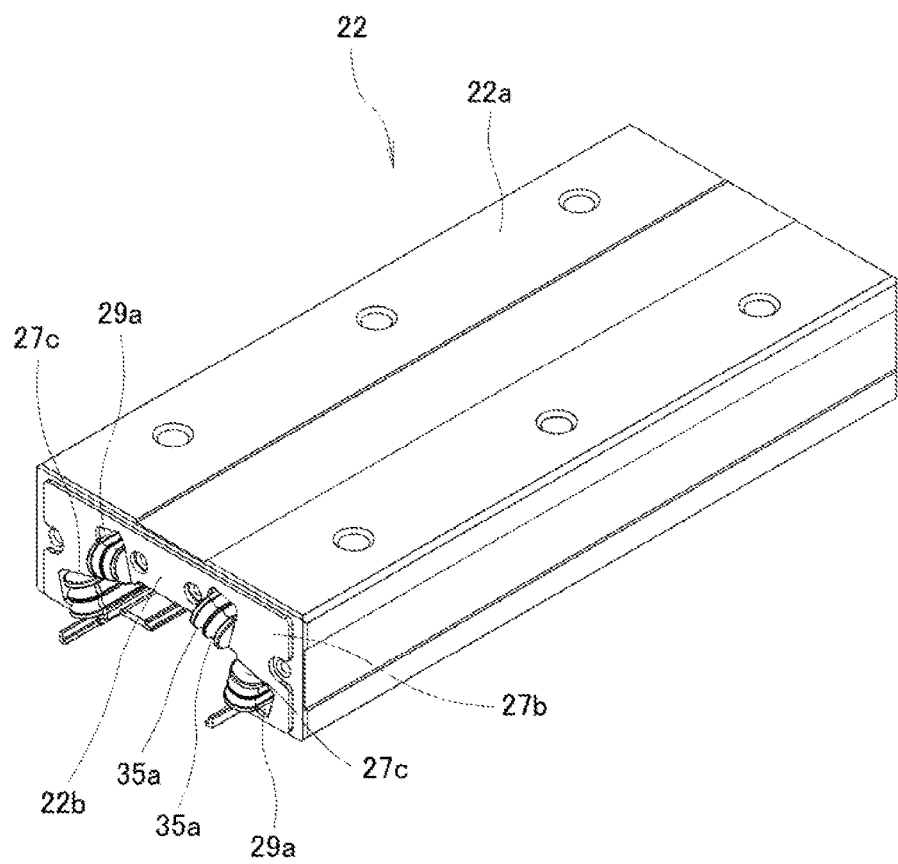

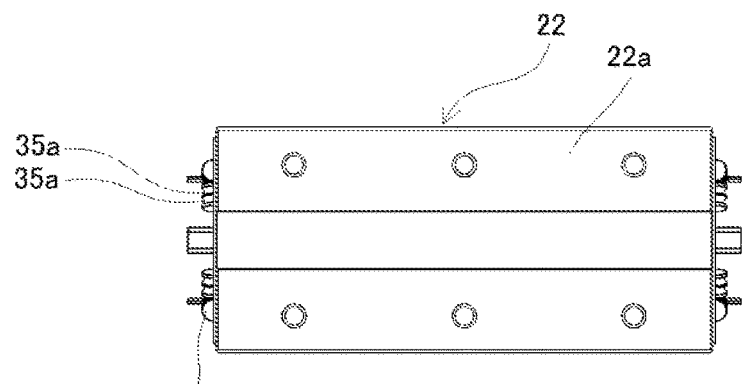
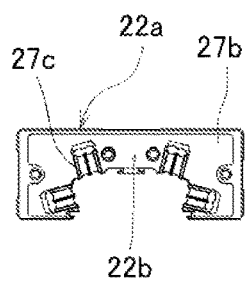
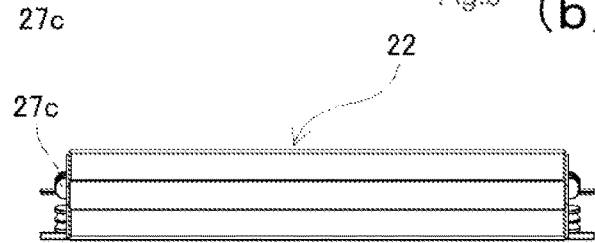
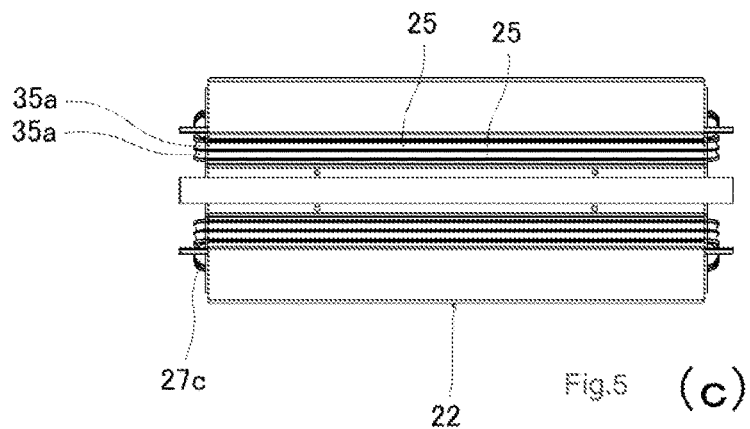

[Fig. 8]
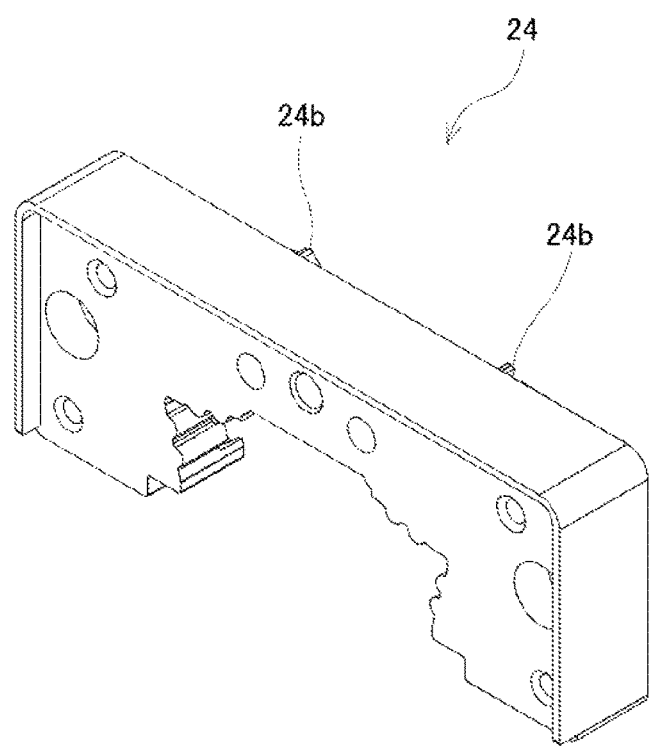

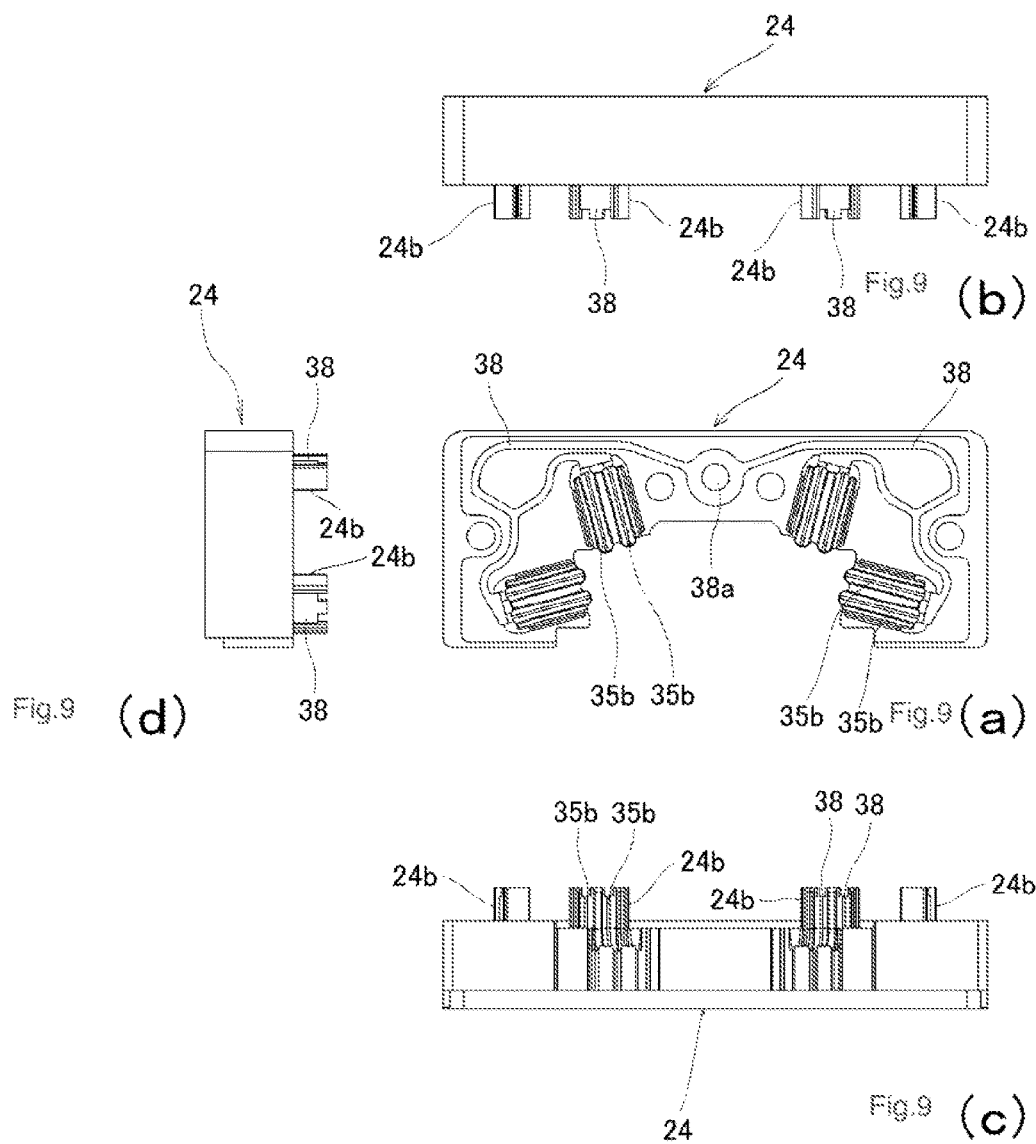

[Fig. 10]
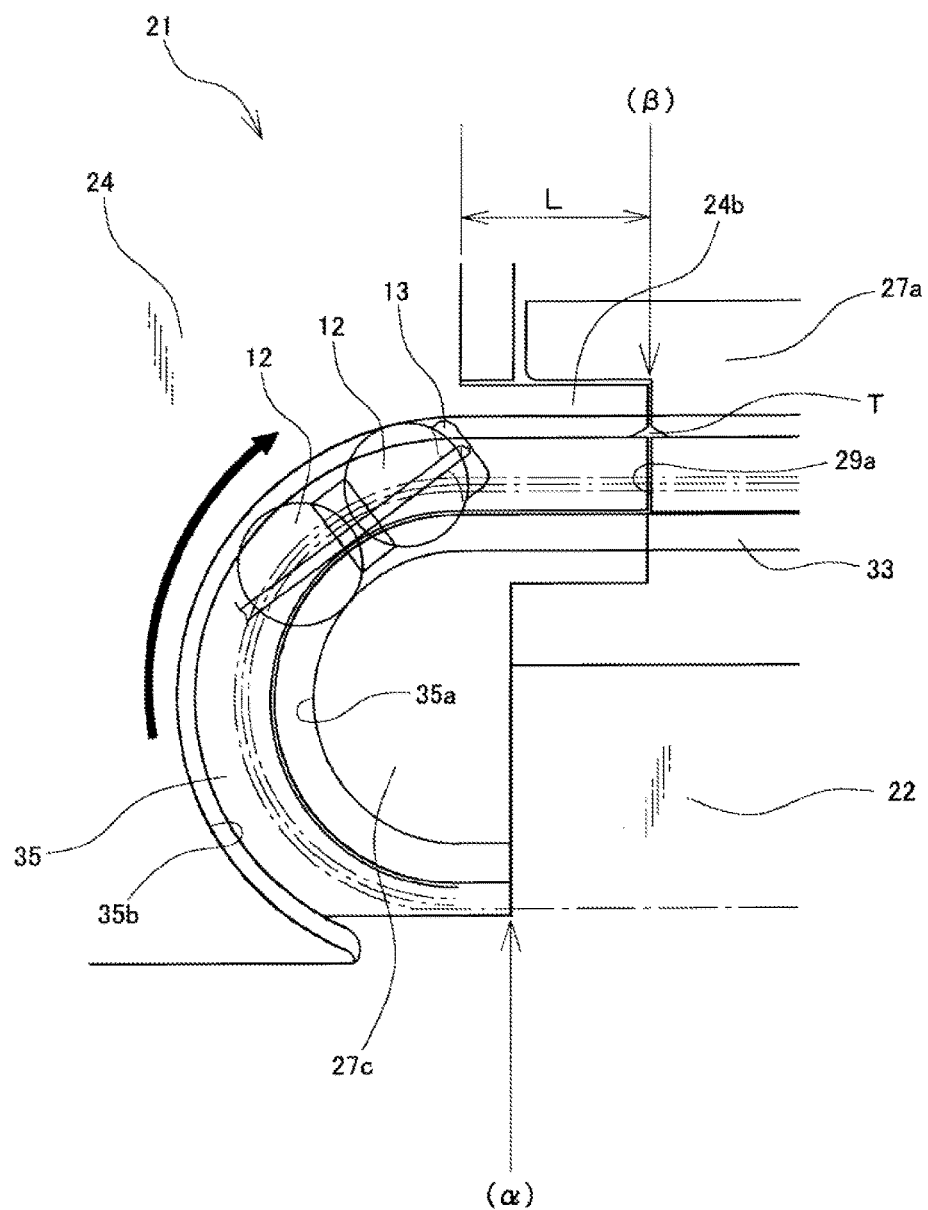

[Fig. 11]
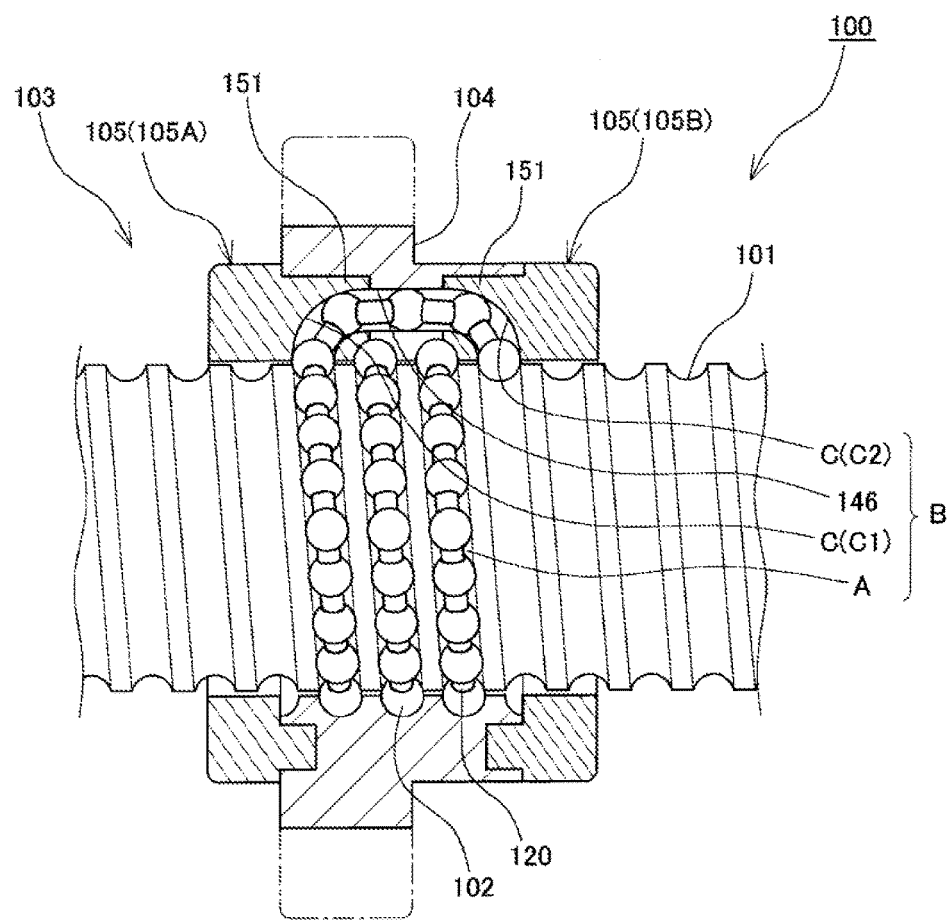

[Fig. 12]
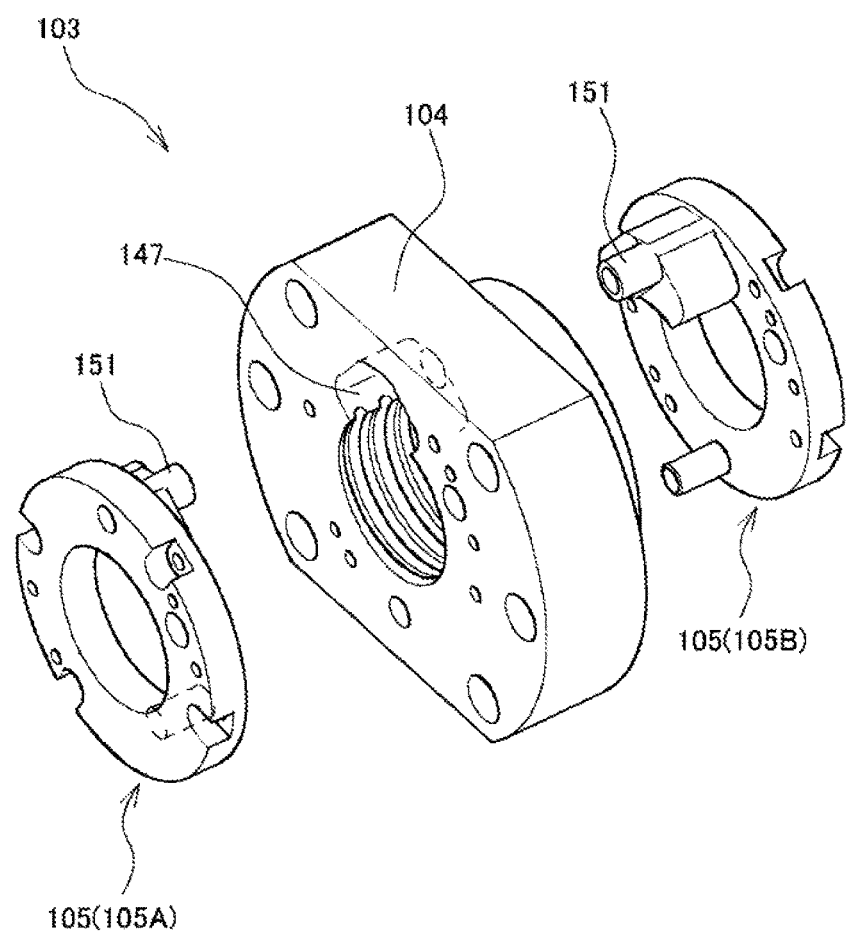

[Fig. 13]
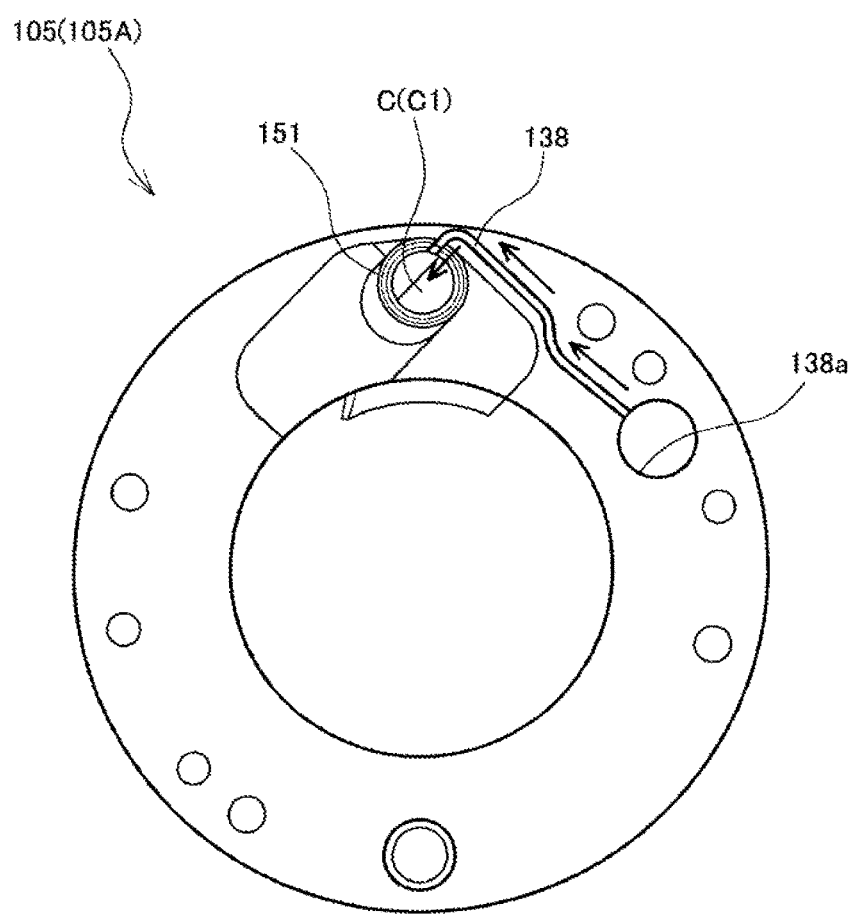

[Fig. 14]
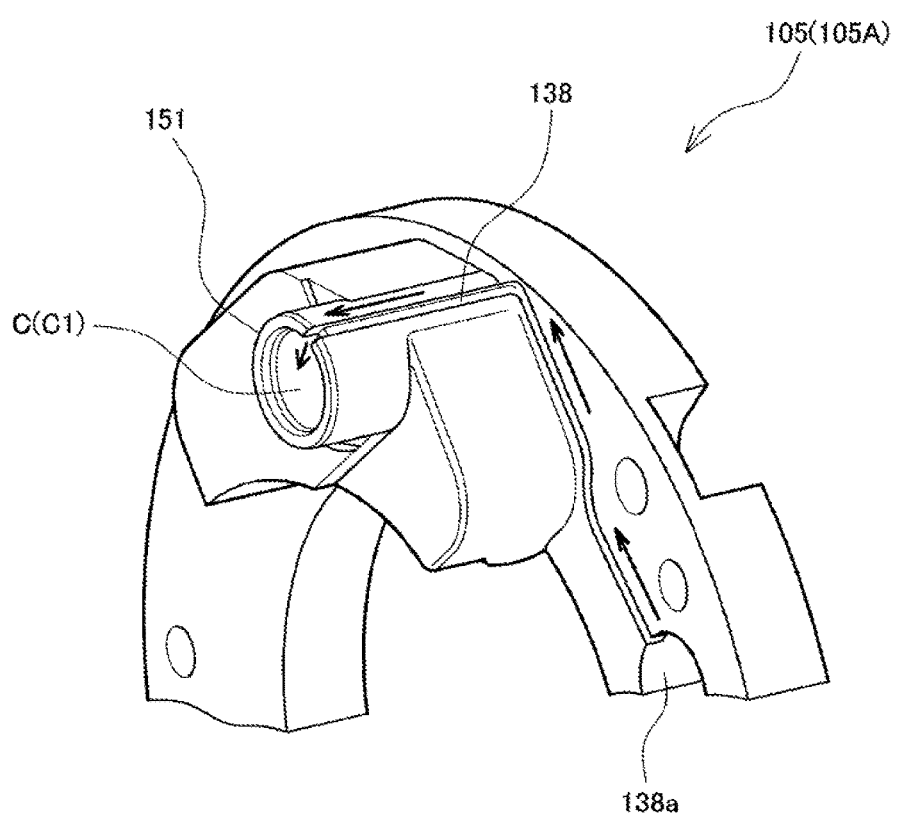

ROLLING DEVICE

TECHNICAL FIELD

The present invention relates to a rolling device.

BACKGROUND ART

Conventionally, as a machine element part for moving a linear movement portion of a machine lightly and accurately, a rolling device such as a linear guide and a ball screw device is known. For example, the rolling device, as the linear guide includes a track rail and a movable block attached to the track rail to be movable in a reciprocating manner via balls installed as multiple rolling elements. The track rail is an elongated member with a cross-section thereof perpendicular to a longitudinal direction thereof formed approximately in a rectangular shape. On surfaces (an upper surface and both side surfaces) of the track rail, rolling element rolling grooves serving as tracks when balls roll are formed over the entire length of the track rail. Meanwhile, the track rail is formed to extend linearly or in a curved manner.

On the other hand, the movable block includes a movable block main body portion made of a metal material and a pair of end plates installed on tooth end surfaces of the movable block main body portion in a moving direction and made of a resin material. The movable block main body portion is provided with loaded rolling element rolling grooves at corresponding positions to the rolling element rolling grooves. Each rolling element rolling groove of the track rail and each loaded rolling element rolling groove formed in the movable block main body portion form a loaded rolling element rolling raceway. The plurality of balls guided into this raceway roll while being loaded. The movable block main body portion also includes non-loaded rolling element rolling raceways extending parallel to the loaded rolling element rolling grooves. Also, each of the paired end plates is provided with a direction changing raceway connecting each non-loaded rolling element rolling raceway to each loaded rolling element rolling raceway. Combination of one loaded rolling element rolling raceway and one non-loaded rolling element rolling raceway and a pair of direction changing raceways connecting them constitutes one endless circulation raceway.

By installing the plurality of balls into the endless circulation raceway constituted by the non-loaded rolling element rolling raceway, the loaded rolling element rolling raceway, and the pair of direction changing raceways to enable endless circulation, relative reciprocating movement of the movable block to the track rail can toe performed.

CITATION LIST

Patent Literature

Patent Literature 1: JP 2009-068658 A

DISCLOSURE OF THE INVENTION

Problems to be Solved by the Invention

In the recent industry, there exists a demand for enlarging an applicable range of the aforementioned rolling device. Device manufacturers are required to provide the market with a rolling device further improved in guiding accuracy. Under such circumstances, the present applicant has provided the market with rolling devices of various kinds such as a rolling device including eight rows of endless circulation raceways as disclosed in Patent Literature 1 shown above.

However, to keep guiding accuracy of each of the rolling devices of various kinds, it is necessary to achieve a configuration enabling a plurality of rolling elements to circulate in the endless circulation raceway smoothly.

The present invention has been made to improve the foregoing cases, and an object of the present invention is to provide a novel rolling device achieving a configuration enabling a plurality of rolling elements to circulate in an endless circulation raceway smoothly.

Means for Solving the Problems

A rolling device in accordance with the present invention includes: an inner member provided with a rolling element rolling groove; and an outer member attached to the inner member to be relatively movable via a plurality of rolling elements, wherein the outer member includes: an outer member main body portion including a loaded rolling element rolling groove forming a loaded rolling element rolling raceway in cooperation with the rolling element rolling groove and a non-loaded rolling element rolling raceway arranged to correspond to the loaded rolling element rolling groove; and a pair of lids attached to both end surfaces of the outer member main body portion in a relatively-moving direction and having at least a part of a direction changing raceway connecting one end of the loaded rolling element rolling raceway to one end of the non-loaded rolling element rolling raceway, wherein each of the lids is provided with a projection portion including at least the part of the direction changing raceway so as for at least the part of the direction changing raceway formed in the lid to project from a connection surface between the lid and the outer member main, body portion toward the outer member main body portion, and wherein the projection portion is provided with a lubricant supply path.

Effects of the Invention

In accordance with the present invention, it is possible to provide a rolling device achieving a configuration enabling a plurality of rolling elements to circulate in an endless circulation raceway smoothly.

BRIEF DESCRIPTION OF THE DRAWINGS

FIG. 1 is a partially broken perspective view for describing a rolling device in accordance with a first embodiment of the present invention.

FIG. 2 is a partial vertical cross-sectional front view of the rolling device in accordance with the first embodiment of the present invention and illustrates a state in FIG. 1 seen from a front side.

FIG. 3 is an external perspective view of a track rail serving as an inner member in accordance with the first embodiment of the present, invention.

FIG. 4 is an external perspective view of a movable block main body portion serving as an outer member main body portion in accordance with the first embodiment of the present invention.

FIGS. 5(a) to 5(d) illustrate the movable block main body portion illustrated in FIG. 4. FIG. 5(a) is a side view. FIG. 5(b) is a plan view, FIG. 5(c) is a bottom view, and FIG. 5(d) is a front view.

FIG. 6(a) illustrates a part made of a metal material while FIG. 6(b) illustrates a part made of a resin material.

FIG. 7(a) illustrates the part made of the metal material while FIG. 7(b) illustrates the part made of the resin material.

FIG. 8 is an external perspective view of an end plate serving as a lid in accordance with the first embodiment of the present invention.

FIGS. 9(a) to 9(d) illustrate the end plate illustrated in FIG. 8. FIG. 9(a) is a rear view, FIG. 9(b) is a plan view, FIG. 9(c) is a bottom view, and FIG. 9(d) is a side view.

FIG. 10 is a schematic view illustrating a vertical cross-section of a movable block in accordance with the first embodiment of the present invention and illustrates connection relationship between the movable block main body portion and the end plate.

FIG. 11 is a cross-sectional view illustrating a schematic configuration of a ball screw device in accordance with a second embodiment of the present invention.

FIG. 12 is an exploded perspective view illustrating the schematic configuration of the ball screw device in accordance with the second embodiment of the present invention.

FIG. 13 is a front view of an end cap in accordance with the second embodiment of the present invention and illustrates a contacting surface thereof with a nut main body serving as an outer member main body portion.

FIG. 14 is a perspective view of a main part of the end cap in accordance with the second embodiment of the present invention.

MODE FOR CARRYING OUT THE INVENTION

First Embodiment

Hereinbelow, embodiments of the present invention will be described with reference to the drawings. It is to be noted that the following embodiments do not limit the invention according to each claim, and that not all components described in the following embodiments are necessary as means for achieving the invention.

Figure 6:
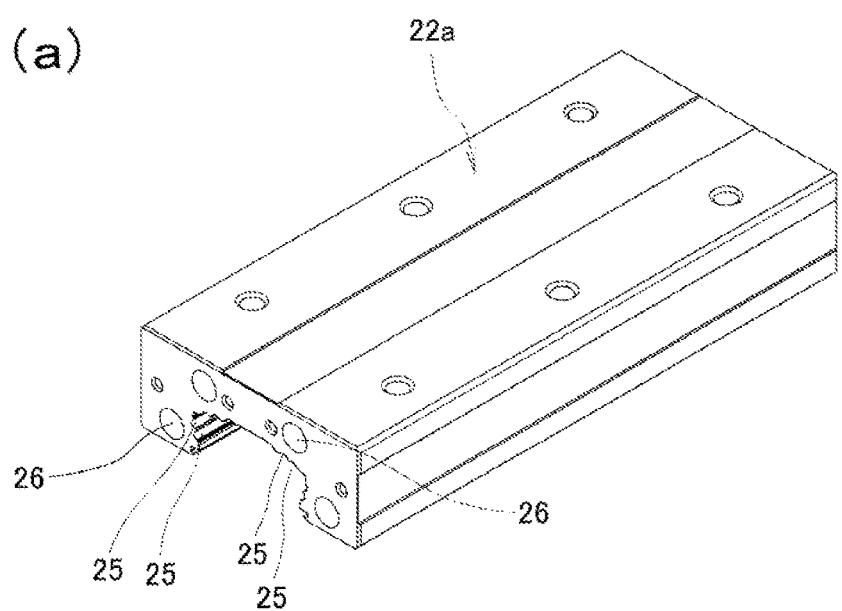
FIGS. 6(a) and 6(b) are exploded perspective views of the movable block main body portion illustrated in FIG. 4.
Figure 6:
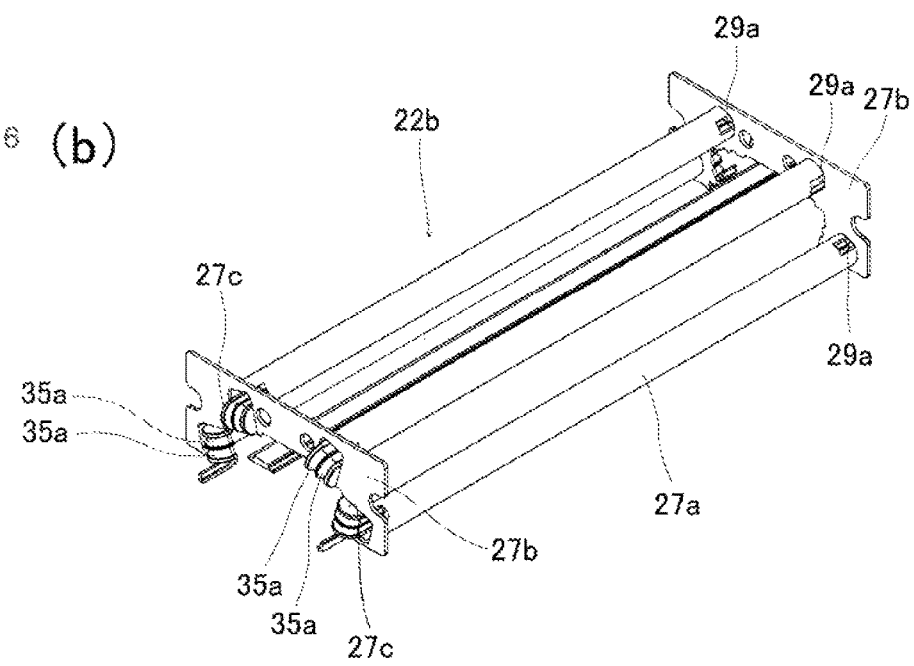
Figure 7:
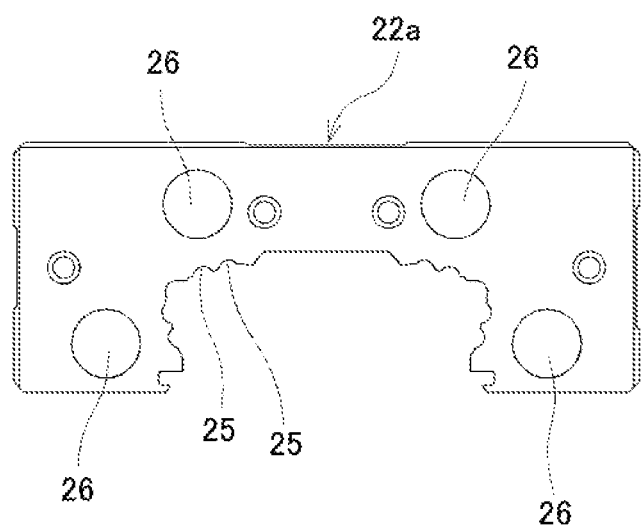
FIGS. 7(a) and 7(b) are exploded front views of the movable block main body portion illustrated in FIG. 4.
Figure 7:
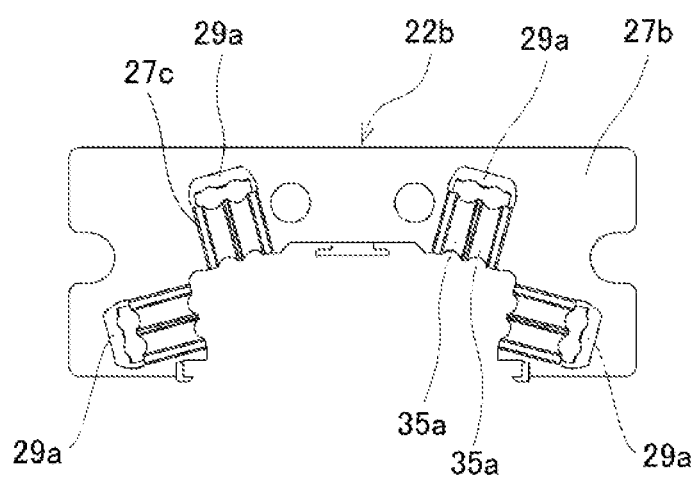

FIG. 1 is a partially broken perspective view for describing a rolling device in accordance with a first embodiment. FIG. 2 is a partial vertical cross-sectional, front view of the rolling device in accordance with the first embodiment and illustrates a state in FIG. 1 seen from a front side. FIG. 3 is an external perspective view of a track rail serving as an inner member in accordance with the first embodiment while FIG. 4 is an external perspective view of a movable block main body portion serving as an outer member main body portion in accordance with the first embodiment. FIGS. 5(a) to 5(d) illustrate the movable block main body portion illustrated in FIG. 4. FIG. 5(a) is a side view, FIG. 5(b) is a plan view, FIG. 5(c) is a bottom view, and FIG. 5(d) is a front view. FIGS. 6(a) to 7(b) are exploded perspective views and exploded front views of the movable block main body portion illustrated in FIG. 4. FIGS. 6(a) and 7(a) illustrate a part made of a metal material while FIGS. 6(b) and 7(b) illustrate a part made of a resin material. FIG. 8 is an external perspective view of an end plate serving as a lid in accordance with the first embodiment. FIGS. 9(a) to 9(d) illustrate the end plate illustrated in FIG. 8. FIG. 9(a) is a rear view, FIG. 9(b) is a plan view, FIG. 9(c) is a bottom view, and FIG. 9(d) is a side view.

A rolling device 10 in accordance with the first embodiment includes a track rail 11 serving as an inner member formed to extend in a longitudinal direction and a movable block 21 serving as an outer member to be attached to the track rail 11 to be relatively movable via a plurality of balls 12.

The members constituting the rolling device 10 will schematically be described. As illustrated, in FIG. 3, the track rail 11 is an elongated member with a cross-section thereof perpendicular to the longitudinal direction thereof formed approximately in a horizontally-long rectangular shape. On surfaces (an upper surface and both side surfaces) of the track rail 11, rolling element rolling grooves 11a . . . serving as tracks when the balls 12 roll are formed over the entire length of the track rail 11.

Also, the track rail 11 in accordance with the first embodiment is provided on the upper surface with four rows of rolling element rolling grooves 11a and on each of the side surfaces with two rows of rolling element rolling grooves 11a, that is, eight rows of rolling element rolling grooves 11a in total. The eight rows of rolling element rolling grooves 11a are formed so as for two rows of rolling element rolling grooves 11a and 11a to be each pair and to approach to and be parallel to each other. Especially, the four rows of rolling element rolling grooves 11a formed on the upper surface of the track rail 11 are arranged so as for each pair to be located to each outer side in a width direction of the upper surface. Each pair consisting of two rows of rolling element rolling grooves 11a and 11a located to each outer side in the width direction of the upper surface and each pair consisting of two rows of rolling element rolling grooves 11a and 11a formed on the side surface close to the pair are arranged at corresponding positions with a corner portion on an upper side of the track rail 11 interposed therebetween. It is to be noted that, in a similar manner to the case of the conventional technique, the track rail 11 in accordance with the first embodiment may be formed in a linear shape as illustrated in FIG. 3 or in a curved shape with a constant curvature.

On the other hand, the movable block 21 includes a movable block main body portion 22 serving as an outer member main body portion made by integrally combining a metal material and a resin material in a non-detachable state as illustrated in FIG. 4 and a pair of end plates 24 and 24 (refer to FIG. 8) serving as a lid attached to both end surfaces of the movable block main body portion 22 in a relatively-moving direction as illustrated in FIG. 1.

As illustrated further in detail in FIGS. 6(a) to 7(b), a metal material component part 22a in the movable block main body portion 22 in accordance with the first embodiment has loaded rolling element rolling grooves 25, forming loaded rolling element rolling raceways in cooperation with the rolling element rolling grooves 11a formed in the track rail 11, on a surface thereof to be opposed to the track rail 11 when the movable block 21 and the track rail 11 are assembled. The metal material component part 22a in the movable block main body portion 22 also has through holes 26 penetrating in parallel with the loaded rolling element rolling grooves 25 at positions away from the loaded rolling element rolling grooves 25 by a predetermined distance.

In the through holes 26 formed to penetrate the metal material component part 22a in the movable block main body portion 22, a resin material component part 22b in the movable block main body portion 22 illustrated in FIGS. 6(b) and 7(b) is integrally provided in a non-detachable state. That is, the resin material component part 22b in the movable block main body portion 22 has four cylindrical pipe bodies 27a each having formed therein two rows of non-loaded rolling element rolling raceways 33 and 33, two plate bodies 27b arranged at both end portions of the four pipe bodies 27a, and eight returning members 27c provided to project outward from the plate bodies 27b. As illustrated in FIGS. 4 to 5(d), the four through holes 26 formed to penetrate the metal material component part 22a are provided with the four pipe bodies 27a, and the two plate bodies 27b are respectively arranged in close contact with both the end portions of the metal material component part 22a in the axial direction. All of the four pipe bodies 27a, the two plate bodies 27b, and the eight returning members 27c are configured to be combined integrally and can be manufactured in a state illustrated in FIG. 4 by using an injection, molding technique or the like to the metal material component part 22a, for example.

As in the above manner, by inserting and installing the pipe bodies 27a of the resin material component part 22b into the through holes 26 formed to penetrate the metal material component part 22a, the non-loaded rolling element rolling raceways 33 arranged parallel to the loaded rolling element rolling raceways formed by the rolling element rolling grooves 11a and the loaded rolling element rolling grooves 25 are formed.

Next, a more specific configuration of the returning member 27c will be described. The eight returning members 27c in accordance with the first embodiment are installed in total, with four returning members 27c installed on each end surface of the metal material component part 22a in the movable block main body portion 22 in the relatively-moving direction. Each of the eight returning members 27c is provided with two rows of inner circumferential side direction changing grooves 35a to connect ends of the two rows of non-loaded rolling element rolling raceways 33 and 33 formed inside the pipe body 27a to ends of the two adjacent rows of loaded rolling element rolling grooves 25 and 25 formed in the metal material component part 22a. Meanwhile, since the metal material component part 22a and the resin material component part 22b constituting the movable block main body portion 22 are configured integrally by the injection molding technique as described above, the inner circumferential side direction changing grooves 35a connecting the loaded rolling element rolling raceways to the non-loaded rolling element rolling raceways 33 can achieve smooth connection states.

Next, a configuration of the end plate 24 in accordance with the first embodiment will be described with reference to FIGS. 8 to 9(d). The end plate 24 in accordance with the first, embodiment is a member to be attached to each end surface of the movable block main body portion 22 in the relatively-moving direction to cover the returning members 27c. The end plate 24 is provided with outer circumferential side direction changing grooves 35b on a surface thereof to be connected to the movable block main body portion 22. When the outer circumferential side direction changing groove 35b and the inner circumferential side direction changing groove 35a of the returning member 27c are cooperated, a direction changing raceway 35 connecting one end of the loaded rolling element rolling raceway to one end of the non-loaded rolling element rolling raceway 33 can be formed.

Also, the end plate 24 in accordance with the first embodiment is provided with, projection portions 24b projecting from the surface thereof to be connected to the movable block main body portion 22. Each of the projection, portions 24b is formed per pair of two adjacent rows of outer circumferential side direction changing grooves 35b and 35b, and the four projection portions 24b are formed in the first embodiment. Also, each of the projection portions 24b provided in the end plate 24 is provided with the outer circumferential side direction changing grooves 35b and 35b.

The movable block main body portion 22 to be provided with the end plate 24 is provided with recesses 29a allowing the projection portions 24b provided in the end plate 24 to be fitted therein (refer to FIGS. 6(b) and 7(b)). Thus, in this direction changing raceway 35 formed by the inner circumferential side direction changing groove 35a of the returning member 27c and the outer circumferential side direction changing groove 35b of the end plate 24, the outer circumferential side direction changing groove 35b is formed to extend to a tip end of the projection portion 24b provided in the end plate 24. Accordingly, when the end plate 24 is installed into the movable block main body portion 22 to cover the returning member 27c, a seam between the non-loaded rolling element rolling raceway 33 and the outer circumferential side direction changing groove 35b as a part of the direction changing raceway 35 is located inside the movable block main body portion 22.

Conversely, the inner circumferential side direction changing groove 35a has no seam since the returning member 27c and the pipe body 27a having formed therein the two rows of non-loaded rolling element rolling raceways 33 and 33 are integrally molded. Thus, in the first embodiment, the seam between at least a part of the direction changing raceway 35 and the non-loaded rolling element rolling raceway 33 is located inside the movable block main body portion 22.

By providing the paired end plates 24 and 24 on both the end surfaces of the movable block main body portion 22 configured in this manner in the moving direction to cover the returning members 27c, the movable block 21 is completed. That is, by connecting the paired end plates 24 and 24 to both the end surfaces of the movable block main body portion 22 molded integrally with the returning members 27c to cover the returning members 27c, the loaded rolling element rolling raceways, the non-loaded rolling element rolling raceways 33, and the pair of direction changing raceways 35 and 35 are formed. The plurality of balls 12 arranged in endless circulation raceways formed by these rolling raceways circulate in the endless circulation raceways along with relative movement of the movable block 21 to the track rail 11.

Here, FIG. 10 is added as a reference figure, and advantages of the movable block 21 in accordance with the first embodiment will be described. FIG. 10 is a schematic view illustrating a vertical cross-section of the movable block 21 in accordance with the first embodiment and illustrates connection relationship between the movable block main body portion 22 and the end plate 24.

As described above, since the outer circumferential side direction changing groove 35b as a part of the direction changing raceway 35 in accordance with the first embodiment is formed to extend to the tip end of the projection portion 24b, the seam between the non-loaded rolling element rolling raceway 33 and the direction changing raceway 35 is located inside the movable block main body portion 22. That is, in FIG. 10, while a connection surface between the movable block main body portion 22 and the end plate 24 is located at the sign (α), the seam between the outer circumferential side direction changing groove 35b as a part of the direction changing raceway 35 and the non-loaded rolling element rolling raceway 33 is located at the sign (β). Also, in such a configuration, since the outer circumferential side direction changing groove 35b as a part of the direction changing raceway 35 in accordance with the first embodiment illustrated in FIG. 10 is formed, to extend to the tip end of the projection portion 24b, the outer-circumferential side direction changing groove 35b has a linear part having a length L in a path connected to the non-loaded rolling element rolling raceway 33.

Thus, in accordance with the first embodiment, the linear part having the length L exists in the path of the direction changing raceway 35, the seam between the direction changing raceway 35 and the non-loaded rolling element rolling raceway 33 is located inside the movable block main body portion 22, and the seam exists in the linear path of the direction changing raceway 35 and the non-loaded rolling element rolling raceway 33. Accordingly, even in a case where the seam has a non-smooth part, a tip end of a retainer 13 is hard to get stuck in the seam.

Further, in the case of the first embodiment, the seam between the direction changing raceway 35 and the non-loaded rolling element rolling raceway 33 is provided with a tapered shape T. Accordingly, a line of the balls 12 arranged in a lined-up state by the retainer 13 can achieve smoother rolling movement.

Meanwhile, as for the length L of the linear part of the direction, changing raceway 35, in a case of a full-ball type without the retainer 13, smooth rolling movement of the ball row can be achieved when L=1.5 Da (Da is a ball diameter) or longer, and the design safety ratio is drastically improved when L=2.0 Da (Da is a ball diameter) or longer. Also, in a case of a type of using the retainer 13 for lining-up of the row of the balls 12, smooth rolling movement of the ball retainer can be achieved when the length L is as long as two pitches of the balls.

Also, as for the tapered shape T formed in the seam between the direction changing raceway 35 and the non-loaded rolling element rolling raceway 33, it is favorable to employ T=1.0 Da (Da is a ball diameter) or longer.

Further, in the first embodiment, as illustrated in FIG. 9(a), the end plate 24 in accordance with the first embodiment is provided at each of the eight rows of outer circumferential side direction changing grooves 35b with a lubricant supply groove 38 serving as a lubricant supply path in accordance with the present invention so as for a lubricant to be supplied via a path similar in shape and distance among the eight rows, from a lubricant supply portion 38a to the outer-circumferential side direction changing groove 35b. That is, the lubricant supply groove 38 in accordance with the first embodiment is configured so as for branched grooves thereof to have approximately equal shapes (symmetrical shape) and distances and respectively reach the eight rows of outer circumferential side direction changing grooves 35b. Thus, by using the lubricant supply groove 38 in accordance with the first embodiment, the lubricant is to be supplied to the eight rows of outer circumferential side direction changing grooves 35b evenly, and a problem of the rolling device due to poor lubrication can be prevented from occurring appropriately.

Also, the lubricant supply groove 38 in accordance with the first embodiment is formed up to the tip end of the projection portion 24b provided in the end plate 24. That is, in accordance with the first embodiment, the lubricant is to be supplied to the seam between the direction changing raceway 35 and the non-loaded rolling element rolling raceway 33. That is, in the first embodiment, the lubricant supply groove 38 formed in the projection port ion 24b is formed to be connected to the non-loaded rolling element rolling raceway 33. Thus, since the lubricant is to be supplied at a part of the linear path, the lubricant is to be applied to the balls favorably, and a problem of the rolling device due to poor lubrication can be prevented from occurring appropriately.

Although the embodiment of the present invention has been described, above, a technical scope, of the present invention is not limited to the scope described in the above embodiment. The above first embodiment can be altered or modified in various ways.

For example, although all of the four pipe bodies 27a, the two plate bodies 27b, and the eight returning members 27c are combined integrally in the above first embodiment, these members may be configured separately and assembled.

Also, although the rolling device including the eight rows of endless circulation raceways has been illustrated, in the above first embodiment, the present invention is applicable to another rolling device, not only to this rolling device, and the number of rows of endless circulation raceways may be any number.

Further, although the rolling device in accordance with the present, invention has been configured as a linear guide in the above first embodiment, the present invention can be applied to a rolling device other than the linear guide, such as a ball screw device.

Second Embodiment

Next, as one of various application examples of the present invention, a rolling device in accordance with a second embodiment will be described with reference to FIGS. 11 to 14. FIG. 11 is a cross-sectional view illustrating a schematic configuration of a ball screw device in accordance with the second embodiment. Also, FIG. 12 is an exploded, perspective view illustrating the schematic configuration of the ball screw device in accordance with the second embodiment.

As illustrated in FIGS. 11 and 12, a ball screw device 100 in accordance with the second embodiment includes a screw shaft 101 serving as an inner member and a nut member 103 serving as an outer member to be screwed with the screw shaft 101 via multiple balls 102 and includes an endless circulation raceway B configured to endlessly circulate the balls 102 at the time of relative rotation of the screw shaft 101 and the nut member 103. The endless circulation raceway B includes a loaded ball raceway A serving as a loaded rolling element rolling raceway formed between an outer circumferential surface of the screw shaft 101 and an inner circumferential surface of the nut member 103 and a pair of direction changing raceways C (C1 and C2) each connecting the loaded ball raceway A to each end side of a ball returning hole 146 serving as a non-loaded rolling element rolling raceway formed in the nut member 103.

The nut member 103 includes a nut main body 104 serving as an outer member main body portion made of steel and a pair of end caps 105 (105A and 105B) serving as a pair of lids mounted on this nut main body 104 and made of synthetic resin. By mounting and fixing the paired end caps 105A and 105B to toe fitted into both end portions of the nut main body 104 in the axial direction, the direction changing raceway C is constituted in cooperation with the nut main body 104, and the endless circulation raceway B for the balls 102 is completed.

In such a ball screw device 100, when the nut member 103 is rotated relatively to the screw shaft 101, the nut member 103 moves in a direction of the screw shaft 101 due to relative rotation of the screw shaft 101 and the nut member 103. At this time, the balls 102 roll inside the loaded ball raceway A while being loaded. As illustrated in FIG. 11, spacers 120 are interposed between the balls 102 adjacent to each other in the endless circulation raceway B to prevent the balls 102 from contacting each other directly. Each of the spacers 120 is a disk-shaped member made of synthetic resin and is provided on each of front and rear surfaces thereof with a spherical surface seat allowing a spherical surface of the ball 102 to be seated thereon.

The balls 102 having rolled to one end of the loaded ball raceway A enters the ball returning hole 146 via the direction, changing raceway C formed on one end side of the nut member 103, roll inside the ball returning hole 146, and are then returned to the original loaded ball raceway A via the direction changing raceway C formed on the other end side of the nut member 103.

Here, FIGS. 13 and 14 are added as reference figures. FIG. 13 is a front view of the end cap 105A in accordance with the second embodiment and illustrates a contacting surface thereof with the nut main body 104 serving as an outer member main body portion. Also, FIG. 14 is a perspective view of a main part of the end cap 105A in accordance with the second embodiment.

As illustrated in FIGS. 11 to 14, each end cap 105 (105A) in accordance with the second embodiment includes a projection portion 151 on the contacting surface thereof with the nut main body 104. The projection portions 151 provided in the end caps 105A are provided with the direction changing raceways C (C1 and C2), respectively.

On the other hand, the nut main body 104 to be provided with the end caps 105 (105A and 105B) is provided with a recess 147 allowing the projection portions 151 provided in the end caps 105 (105A and 105B) to be fitted therein (refer to FIG. 12). Thus, the direction changing raceways C (C1 and C2) are formed to extend to a tip ends of the projection portions 151 provided in the end caps 105 (105A and 105B). Accordingly, when the end caps 105 (105A and 105B) are installed into the nut main body 104, a seam, between each of the direction changing raceways C (C1 and C2) and the ball returning hole 146 serving as a non-loaded rolling element rolling raceway is located, inside the nut main body 104 serving as an outer member main body portion.

In the above manner, by providing the paired end caps 105 (105A and 105B) on both the end surfaces of the nut main body 104 in the moving direction, the nut member 103 is completed. Meanwhile, the mode satisfying the condition on the length L of the linear part, existing in the path of the direction changing raceway and the condition on the tapered shape T described with reference to FIG. 10 can be applied to the ball screw device 100 illustrated in FIGS. 11 to 14 although detailed illustration in the figures is omitted. By employing such a configuration, it is possible to achieve the ball screw device 100 enabling a similar effect to that of the aforementioned rolling device 10 serving as a linear guide to be exerted.

Also, in the ball screw device 100 in accordance with the second embodiment, a configuration providing each of the projection portions 151 with a lubricant supply groove 138 serving as a lubricant, supply path in accordance with the present, invention can be employed as illustrated in FIGS. 13 and 14. That is, each of the end caps 105 (105A and 105B) in accordance with, the second embodiment is provided with the lubricant supply groove 138 so as for a lubricant to be supplied from a lubricant supply portion 138a to each of the direction changing raceways C (C1 and C2) formed in each of the projection portions 151. The lubricant supply groove 138 is formed up to the tip end of the projection portion 151 provided in each of the end caps 105 (105A and 105B). Thus, in accordance with the second embodiment, the lubricant is to be supplied to the seam between each of the direction changing raceways C (C1 and C2) and the ball returning hole 146 serving as a non-loaded rolling element rolling raceway. That is, in the second embodiment, the lubricant supply groove 138 formed in the projection portion 151 is formed to be connected to the ball returning hole 146 serving as a non-loaded rolling element rolling raceway. Thus, since the lubricant is to be supplied at a part of the linear path, the lubricant is to be applied to the balls 102 favorably, and a problem of the ball screw device 100 due to poor lubrication can be prevented from occurring appropriately.

Meanwhile, since the lubricant supply groove 138 illustrated in FIGS. 13 and 14 can be formed only by groove processing on the surface of each of the end caps 105 (105A and 105B), an effect of more drastic manufacturing cost reduction can foe obtained than in a conventional technique having manufacturing processes such as through hole processing and plug mounting.

It is apparent from description of the claims that the above altered or modified embodiment can be included in the technical scope of the present invention.

REFERENCE NUMERALS 10 rolling device, 11 track rail, 11a rolling element rolling groove, 12 ball, 13 retainer, 21 movable block, 22 movable block main body portion, 22a metal material component part, 22b resin material component part, 24 end plate, 24b projection portion, 25 loaded rolling element rolling groove, 26 through hole, 27a pipe body, 27b plate body, 27c returning member, 29a recess, 33 non-loaded rolling element rolling raceway, 35 direction changing raceway, 35a inner circumferential side direction changing groove, 35b outer circumferential side direction changing groove, 38 lubricant supply groove, 38a lubricant supply portion, T tapered shape, 100 ball screw device, 101 screw shaft, 102 ball, 103 nut member, 104 nut main body, 105, 105A, 105B end cap, 120 spacer, 138 lubricant supply groove, 138a lubricant supply portion, 146 ball returning hole, 147 recess, 151 projection portion, A loaded ball raceway, B endless circulation raceway, C, C1, C2 direction changing raceway

The invention claimed is:
1. A rolling device comprising:
an inner member provided with a rolling element rolling groove;
and an outer member attached to the inner member to be relatively movable via a plurality of rolling elements, wherein the outer member includes:
an outer member main body portion including a loaded rolling element rolling groove forming a loaded rolling element rolling raceway in cooperation with the rolling element rolling groove and a non-loaded rolling element rolling raceway arranged to correspond to the loaded rolling element rolling groove; and
a pair of lids attached to both end surfaces of the outer member main body portion in a relatively-moving direction and having at least a part of a direction changing raceway connecting one end of the loaded rolling element rolling raceway to one end of the non-loaded rolling element rolling raceway,
wherein each of the lids is provided with a projection portion including at least the part of the direction changing raceway so as for the at least the part of the direction changing raceway formed in the lid to project from a connection surface between the lid and the outer member main body portion toward the outer member main body portion, and wherein the projection portion is provided with a lubricant supply groove that is formed on an outer circumferential surface of the projection portion, and the lubricant supply groove formed up to a tip end of the outer circumferential surface of the projection portion.

2. The rolling device according to claim 1, wherein the lubricant supply groove formed in the projection portion is fluidly connected to the non-loaded rolling element rolling raceway.

3. The rolling device according to claim 1, wherein at least the part of the direction changing raceway and the non-loaded rolling element rolling raceway have a seam thereof formed in a tapered shape.

4. The rolling device according to claim 1, configured as a linear guide.

5. The rolling device according to claim 1, configured as a ball screw device.

* * * * *